(12) United States Patent
Nishimoto et al.

(10) Patent No.: US 8,904,093 B1
(45) Date of Patent: Dec. 2, 2014

(54) MANAGING LIFETIME OF LIMITED USAGE STORAGE DEVICES IN A CACHING SYSTEM

(75) Inventors: Michael Nishimoto, Saratoga, CA (US); Jaspal Kohli, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 110 days.

(21) Appl. No.: 13/524,068

(22) Filed: Jun. 15, 2012

(51) Int. Cl.
*G06F 12/00* (2006.01)

(52) U.S. Cl.
USPC ............ 711/103; 711/118; 711/156; 711/163

(58) Field of Classification Search
USPC ......................................................... 711/103
See application file for complete search history.

(56) References Cited

U.S. PATENT DOCUMENTS

| | | | |
|---|---|---|---|
| 7,747,813 B2 | 6/2010 | Danilak | |
| 7,904,619 B2 | 3/2011 | Danilak | |
| 8,554,983 B2* | 10/2013 | Jeddeloh | 711/103 |
| 2007/0260811 A1* | 11/2007 | Merry et al. | 711/103 |
| 2008/0114930 A1* | 5/2008 | Sanvido et al. | 711/113 |
| 2008/0126685 A1 | 5/2008 | Danilak | |
| 2008/0126720 A1* | 5/2008 | Danilak | 711/158 |
| 2010/0064096 A1* | 3/2010 | Weingarten et al. | 711/103 |
| 2010/0077096 A1 | 3/2010 | Philip et al. | |
| 2011/0131367 A1* | 6/2011 | Park et al. | 711/103 |

* cited by examiner

*Primary Examiner* — April Y Blair
*Assistant Examiner* — Prasith Thammavong
(74) *Attorney, Agent, or Firm* — Harrity & Harrity, LLP

(57) ABSTRACT

A cache server receives wear usage information associated with a storage device, and receives an object to be cached in the storage device. The cache server also determines whether to store the object in the storage device based on the wear usage information. The cache server provides the object to the storage device for storage when it is determined that the object is to be stored in the storage device, and prevents the object from being stored in the storage device when it is determined that the object is not to be stored in the storage device.

21 Claims, 9 Drawing Sheets

MANAGING LIFETIME OF LIMITED USAGE STORAGE DEVICES IN A CACHING SYSTEM

BACKGROUND

A service provider is an entity (e.g., a business or an organization) that sells bandwidth provided by a network (e.g., the Internet, a data network, a telecommunication network, etc.) associated with the service provider. Service providers may include telecommunications companies, data carriers, wireless communications providers, Internet service providers, cable television operators offering high-speed Internet access, etc. The rapid growth in the transmission of, for example, video content, audio content, images, and software downloads, is creating much higher bandwidth demands on service providers, with sharp bandwidth peaks that may be due to suddenly popular objects or the occurrence of events.

In order to address such higher bandwidth demands, service providers deploy proxy cache devices, such as, cache servers, in their networks. The cache servers can cache popular objects (e.g., data corresponding to video content, audio content, images, software downloads, etc.), which enables the service providers to optimize network utilization and to save on the backhaul bandwidth costs. In one example, the cache servers may store the objects in storage devices that have a limited number of write operations before failure, referred to as limited usage storage devices herein. Examples of such limited use storage devices include storage devices based on NAND flash technology.

In limited usage storage devices, each storage unit or page has a limited number of erase/write cycles before the page can no longer retain data reliably. Erase/write cycles are required when content of a physical page must change or update, such as when new content needs to be written to the page. In order to guarantee the lifetime (e.g., three years, five years, etc.) of a limited usage storage device, the limited usage storage device must perform some type of erase/write cycle throttling. For example, the storage device may utilize the erase limitations to lengthen write operation times, which may ensure that device usage remains under a particular number of erase/write operations for a given period of time. However, lengthening write operations times may degrade the performance of the storage device. Wear leveling is an industry standard technique used to lengthen the lifetime of a limited usage storage device, but wear leveling fails to provide lifetime guarantees. Wear leveling changes the mapping of logical storage addresses to physical storage addresses over time, so that repeated writes to the same storage address will not wear out a specific part of the storage device.

SUMMARY

According to one aspect, a method may include receiving, by a device, wear usage information associated with a storage device; and receiving, by the device, an object to be cached in the storage device. The method may also include determining, by the device, whether to store the object in the storage device based on the wear usage information, and providing, by the device, the object to the storage device for storage when it is determined that the object is to be stored in the storage device. The method may further include preventing, by the device, the object from being stored in the storage device when it is determined that the object is not to be stored in the storage device.

According to another aspect, a device may include a processor to: receive wear usage information associated with a storage device; receive an object to be cached in the storage device; determine whether to store the object in the storage device based on the wear usage information; provide the object to the storage device for storage when it is determined that the object is to be stored in the storage device; and prevent the object from being stored in the storage device when it is determined that the object is not to be stored in the storage device.

According to still another aspect, a computer-readable medium may include one or more instructions that, when executed by a processor of a device, cause the processor to: receive wear usage information associated with a storage device; receive an object to be cached in the storage device; determine whether to store the object in the storage device based on the wear usage information; provide the object to the storage device for storage when it is determined that the object is to be stored in the storage device; and prevent the object from being stored in the storage device when it is determined that the object is not to be stored in the storage device.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Figure 1:
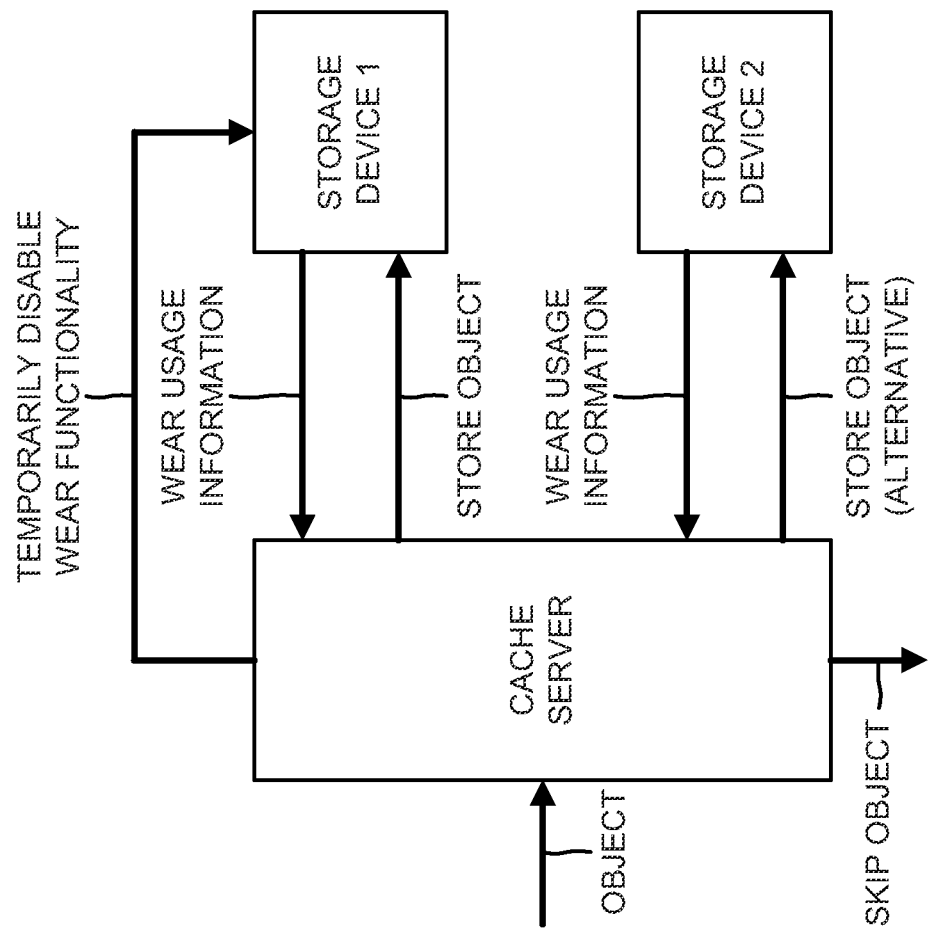
FIG. 1 is a diagram of an overview of an example implementation described herein.

Systems and/or methods described herein may enable a caching system to manage lifetimes (or lives) of limited usage storage devices, such as NAND flash storage devices. FIG. 1 is a diagram of an overview of an example implementation described herein. As shown in FIG. 1, a cache system may include a cache server, a first storage device (e.g., storage device 1), and a second storage device (e.g., storage device 2). The cache server may include one or more server devices that may cache (or store) an object in either the first storage device or the second storage device. In one example, the cache server may store popular objects, which may enable a service provider to optimize network utilization and to save on backhaul bandwidth costs. The storage devices may include limited usage storage devices, such as storage devices based on NAND flash technology.

As further shown in FIG. 1, the first storage device may provide wear usage information to the cache server. The wear usage information may be compared, by the cache server, to a temporal limit of the first storage device, such as number of daily erase/write operations permitted by the first storage device in accordance with a guaranteed life of the first storage device, in order to determine whether to store an object in the first storage device. In one example, the temporal limit may be calculated by the cache server. The wear usage information may include an actual number of erase/write operations (or cycles) performed by the first storage device over a particular time period (e.g., a day, a week, etc.). The second storage device may provide similar wear usage information to the cache server.

The cache server may receive the wear usage information from the first storage device and the second storage device, and may receive an object to be cached (e.g., in one of the first storage device or the second storage device). The cache server may determine whether to store the object in the first storage device based on the wear usage information associated with the first storage device and/or based on information associated with the object (e.g., whether the object is popular content, new content, old content, etc.). If the cache server determines that the object should be stored in the first storage device, the cache server may provide the object to the first storage device for storage. If the cache server determines that the object should not be stored in the first storage device, the cache server may skip storing (i.e., prevent storage) the object in the first storage device. Alternatively, or additionally, if the cache server determines that the object should not be stored in the first storage device, the cache server may provide the object to the second storage device (or one or more other storage devices) for storage.

The cache server may store (e.g., in a memory associated with the cache server) the information associated with the object so that the cache server may utilize such information if the object is provided to the cache server in the future. As further shown in FIG. 1, the cache server may temporarily disable wear functionality associated with the first storage device. The wear functionality may include erase/write cycle throttling, where the first storage device lengthens write operation times, which may ensure that the first storage device usage remains under a particular number of erase/write operations. The cache server may similarly temporarily disable wear functionality associated with the second storage device.

The term "object," as used herein, is to be broadly interpreted to include content, such as video, audio, images, text, software downloads, combinations of video, audio, images, and/or text, etc.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
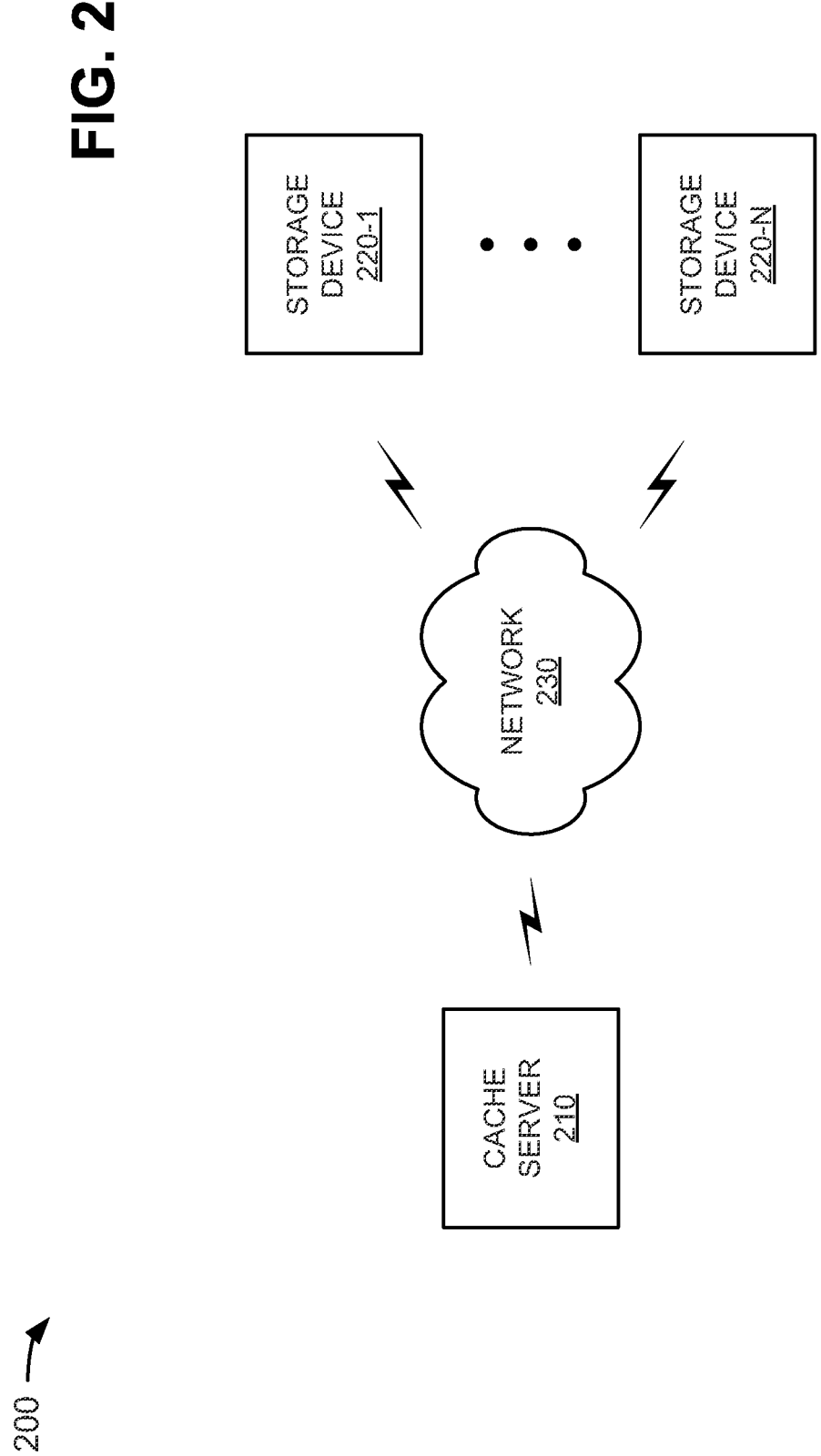
FIG. 2 is a diagram of an example network in which systems and/or methods described herein may be implemented.

FIG. 2 is a diagram of an example network 200 in which systems and/or methods described herein may be implemented. As illustrated, network 200 may include a cache server device 210 (referred to herein as "cache server 210") and one or more storage devices 220-1 through 220-N (collectively referred to herein as "storage devices 220," and, in some instances, singularly as "storage device 220") interconnected by a network 230. Devices/networks of network 200 may interconnect via wired and/or wireless connections or links. A single cache server 210, two storage devices 220, and a single network 230 have been illustrated in FIG. 1 for simplicity. In practice, there may be more cache servers 210, storage devices 220, and/or networks 230. In one example, network 230 may be omitted and cache server 210 may include and/or communicate directly with storage devices 220.

Cache server 210 may include one or more server devices, or other types of computation or communication devices, that gather, process, search, and/or provide information in a manner described herein. In one example implementation, cache server 210 may include one or more server devices that may cache (or store) an object in storage devices 220. In one example, cache server 210 may store popular objects, which may enable a service provider to optimize network utilization and to save on backhaul bandwidth costs. Cache server 210 may receive an object to be cached in one of storage devices 220. Cache server 210 may determine whether to store the object in storage device 220-1 based on wear usage information associated with storage device 220-1 and/or based on information associated with the object (e.g., whether the object is popular content, new content, old content, the size of the object, the rate at which a write of an object needs to be performed (e.g., video transmission rate), an object type, etc.).

If cache server 210 determines that the object should be stored in storage device 220-1, cache server 210 may provide the object to storage device 220-1 for storage. If cache server 210 determines that the object should not be stored in storage device 220-1, cache server 210 may skip storing the object in storage device 220-1. Alternatively, or additionally, if cache server 210 determines that the object should not be stored in storage device 220-1, cache server 210 may provide the object to another storage device (e.g., storage device 220-N) for storage.

Storage device 220 may include one or more storage devices that may store objects, and/or a magnetic and/or optical recording medium and its corresponding drive. In one example implementation, storage device 220 may include a limited usage storage device, such as a storage device based on NAND flash technology, a storage device based on NOR flash technology, and/or storage devices based on other types of non-volatile storage technology. In one example implementation, storage device 220 may receive objects from cache server 210, and may store the received objects. In order to guarantee the lifetime (e.g., three years, five years, etc.) of storage device 220, storage device 220 may perform some type of erase/write cycle throttling. For example, storage device 220 may utilize the erase limitations to lengthen write operation times, which may ensure that storage device 220 usage remains under a particular number of erase/write operations. Storage device 220 may also utilize wear leveling to lengthen the lifetime of storage device 220.

Network 230 may include a service provider network, such as a local area network (LAN); a wide area network (WAN); a metropolitan area network (MAN); a telephone network (e.g., the Public Switched Telephone Network (PSTN) or a cell network); the Internet; or a combination of networks.

Although FIG. 2 shows example devices/networks of network 200, in other implementations, network 200 may include fewer devices/networks, different devices/networks, differently arranged devices/networks, or additional devices/networks than depicted in FIG. 2. Alternatively, or additionally, one or more devices/networks of network 200 may perform one or more other tasks described as being performed by one or more other devices/networks of network 200.

Figure 3:
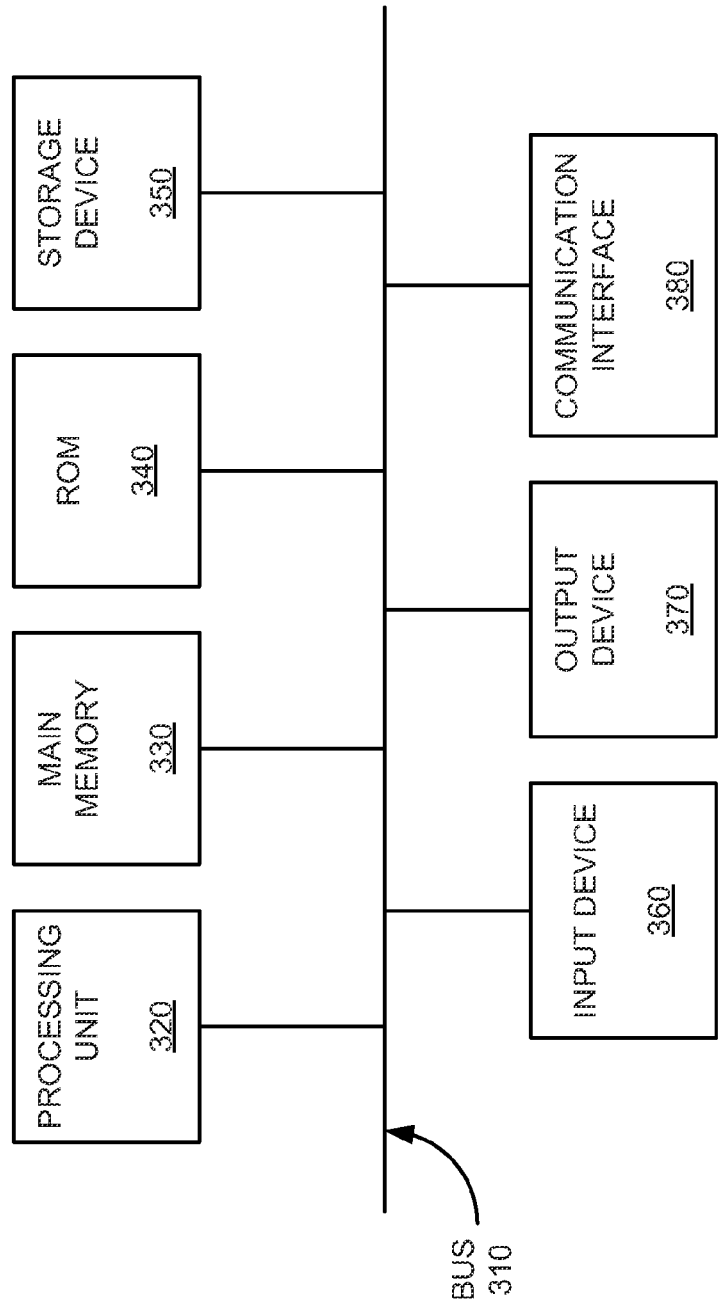
FIG. 3 is a diagram of example components of a cache server or a storage device depicted in FIG. 2.

FIG. 3 is an example diagram of a device 300 that may correspond to one or more devices of network 200. In one example implementation, one or more of the devices of network 200 may include one or more devices 300 or one or more components of device 300. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. In one example, processing unit 320 may be implemented as or include one or more ASICs, FPGAs, or the like. Main memory 330 may include one or more RAMs or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a mouse, a pen, a microphone, voice recognition and/or biometric mechanisms, a remote control, a touch screen, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more other tasks described as being performed by one or more other components of device 300.

Figure 4:
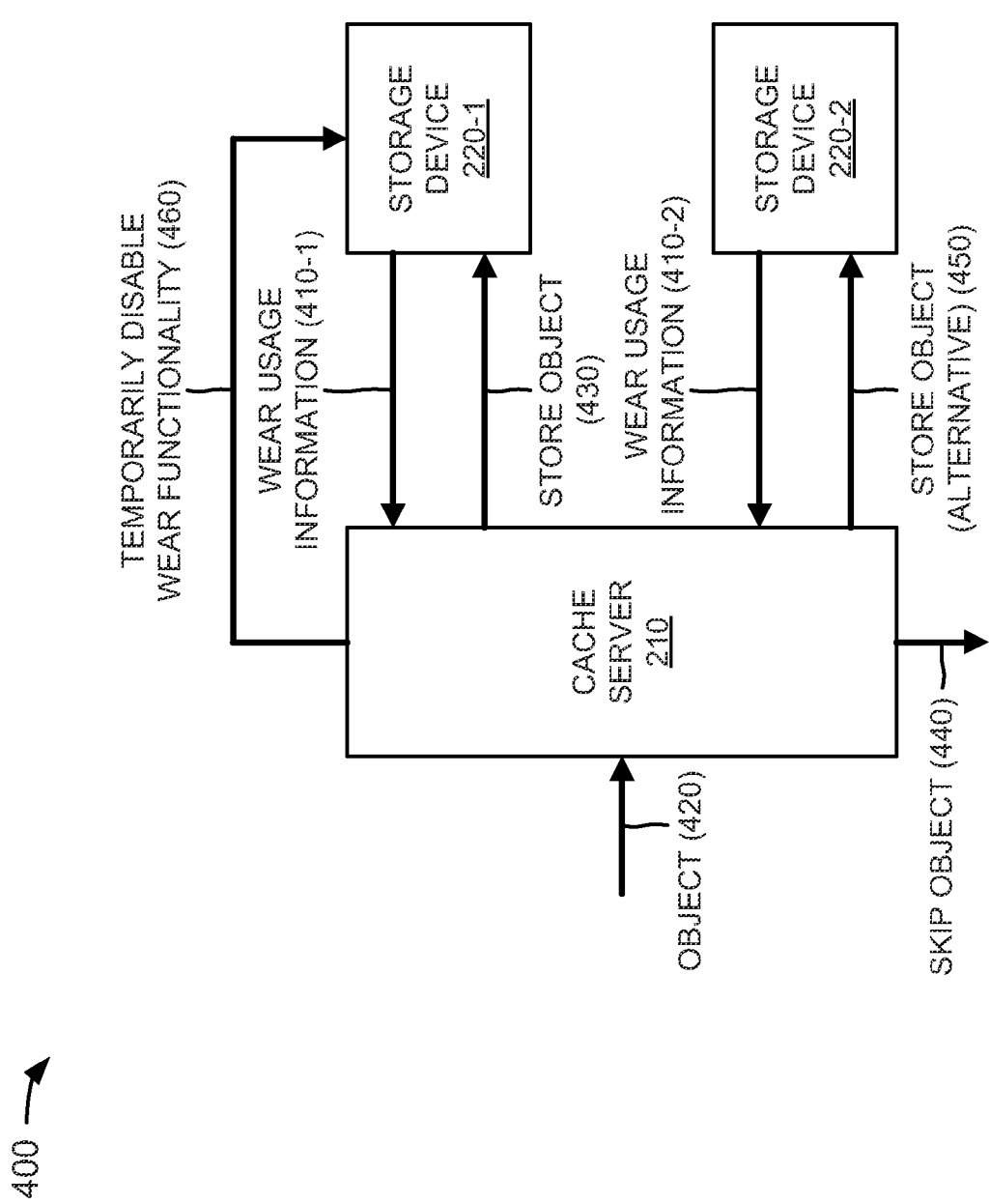
FIG. 4 is a diagram of example operations capable of being performed by an example portion of the network illustrated in FIG. 2.

FIG. 4 is a diagram of example operations capable of being performed by an example portion 400 of network 200 (FIG. 2). As shown, example network portion 400 may include cache server 210, a first storage device 220-1, and a second storage device 220-2. Cache server 210, first storage device 220-1, and second storage device 220-2 may include the features described above in connection with, for example, one or more of FIGS. 1-3.

As further shown in FIG. 4, first storage device 220-1 may provide wear usage information 410-1 to cache server 210. Wear usage information 410-1 may be compared, by cache server 210, to a temporal limit of first storage device 220-1, such as number of daily erase/write operations permitted by first storage device 220-1 in accordance with a guaranteed life of first storage device 220-1, in order to determine whether to store an object in first storage device 220-1. Wear usage information 410-1 may also include an actual number of erase/write operations (or cycles) performed by first storage device 220-1 since first storage device 220-1 was first used.

Second storage device 220-2 may provide wear usage information 410-2 to cache server 210. Wear usage information 410-2 may be compared, by cache server 210, to a temporal limit of second storage device 220-2, such as number of daily erase/write operations permitted by second storage device 220-2 in accordance with a guaranteed life of second storage device 220-2, in order to determine whether to store an object in second storage device 220-2. Wear usage information 410-2 may also include an actual number of erase/write operations (or cycles) performed by second storage device 220-2 since second storage device 220-2 was first used.

Cache server 210 may receive wear usage information 410-1 and 410-2 from first storage device 220-1 and second storage device 220-2, and may receive an object 420 to be cached in one of first storage device 220-1 or second storage device 220-2. Cache server 210 may determine whether to store object 420 in first storage device 220-1 based on wear usage information 410-1 associated with first storage device 220-1 and/or based on information associated with object 420 (e.g., whether object 420 is popular content, new content, old content, the size of object 420, the rate at which a write of object 420 needs to be performed (e.g., video transmission rate), etc.). If cache server 210 determines that object 420 should be stored in first storage device 220-1, cache server 210 may provide object 420 to first storage device 220-1 for storage, as indicated by reference number 430. If cache server 210 determines that object 420 should not be stored in first storage device 220-1, cache server 210 may skip storing object 420 in first storage device 220-1, as indicated by reference number 440. Alternatively, or additionally, if cache server 210 determines that object 420 should not be stored in first storage device 220-1, cache server 210 may provide object 420 to second storage device 220-2 for storage, as indicated by reference number 450.

Cache server 210 may store (e.g., in a memory associated with cache server 210) the information associated with object 420 so that cache server 210 may utilize such information if object 420 is provided to cache server 210 in the future. As further shown in FIG. 4, cache server 210 may temporarily disable wear functionality associated with first storage device 220-1, as indicated by reference number 460. The wear functionality may include erase/write cycle throttling, where first storage device 220-1 lengthens write operation times, which may ensure that first storage device 220-1 usage remains under a particular number of erase/write operations. Cache server 210 may similarly temporarily disable wear functionality associated with second storage device 220-2.

Although FIG. 4 shows example components of network portion 400, in other implementations, network portion 400 may include fewer components, different components, differently arranged components, or additional components than depicted in FIG. 4. Alternatively, or additionally, one or more components of network portion 400 may perform one or more other tasks described as being performed by one or more other components of network portion 400.

Figure 5:
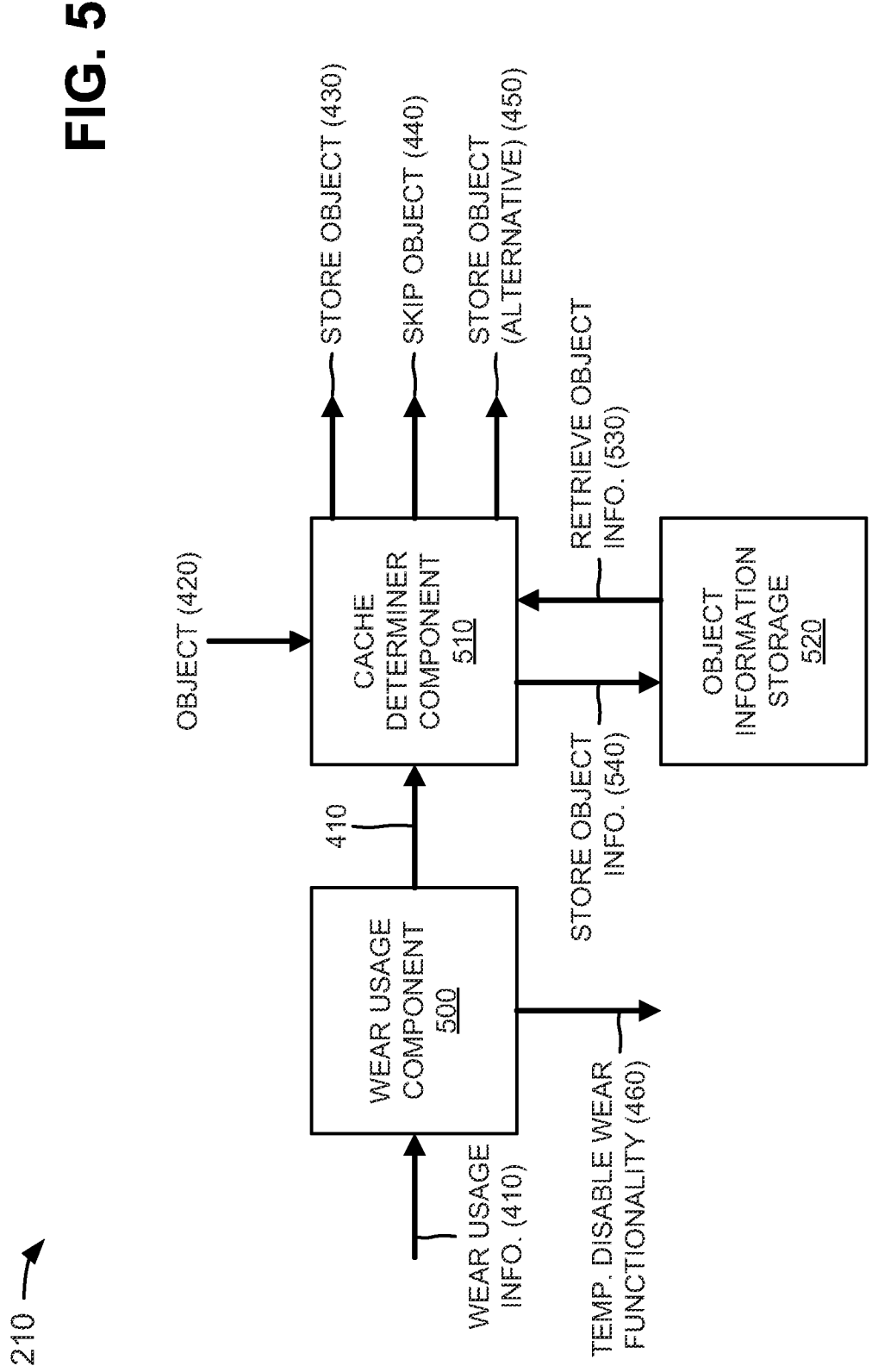
FIG. 5 is a diagram of example functional components of the cache server of FIG. 2.

FIG. 5 is a diagram of example functional components of cache server 210. In one example implementation, one or more of the functional components described in connection with FIG. 5 may be implemented by one or more devices 300

(FIG. 3) or by one or more components of device 300. As shown, cache server 210 may include a wear usage component 500, a cache determiner component 510, and object information storage 520.

Wear usage component 500 may receive wear usage information 410 from storage device 220 (not shown in FIG. 5), and may determine whether to temporarily disable wear functionality, associated with storage device 220, based on wear usage information 410. For example, when wear usage component 500 decides to temporarily disable the wear functionality associated with storage device 220, wear usage component 500 may provide, to storage device 220, instructions 460 that instruct storage device 220 to disable the wear functionality. The wear functionality may include erase/write cycle throttling, where storage device 220 lengthens write operation times, which may ensure that storage device 220 usage remains under a particular number of erase/write operations. Alternatively, or additionally, wear usage component 500 may decide not to disable the wear functionality associated with storage device 220. In such a scenario, the wear functionality may work concurrently with cache server 210 in preserving the lifetime of storage device 220. As further shown in FIG. 5, wear usage component 500 may provide wear usage information 410 to cache determiner component 510.

Cache determiner component 510 may receive wear usage information 410 from wear usage component 500, and may receive object 420 to be cached in storage device 220. Cache determiner component 510 may determine whether to store object 420 in storage device 220 based on wear usage information 410 and/or based on information associated with object 420 (e.g., whether object 420 is popular content, new content, old content, etc.). For example, if a portion of object 420 is already stored in storage device 220, cache determiner component 510 may determine that a remaining portion of object 420 should be stored in storage device 220, as indicated by reference number 430. If object 420 is a new object, cache determiner component 510 may determine that object 420 should not be stored in storage device 220, as indicated by reference number 440. Alternatively, or additionally, if object 420 is a new object, cache determiner component 510 may determine that object 420 should be stored in another storage device 220, as indicated by reference number 450.

In one example implementation, cache determiner component 510 may retrieve (or request and receive) previously stored information 530 associated with object 420 (if any) from object information storage 520. If cache determiner component 510 cannot retrieve previously stored information 530, cache determiner component 510 may determine that object is a new object and should not be stored in storage device 220. Cache determiner component 510 may compare previously stored information 530 with the information associated with object 420 to determine a number of times that object 420 has been requested. Cache determiner component 510 may determine whether to store object 420 in storage device 220 based on the number of times that object 420 has been requested and/or based on wear usage information 410.

In one example, cache determiner component 510 may decide to store object 420 in storage device 220 when the number of times that object 420 has been requested is greater than a particular threshold number (e.g., three, four, five, etc.). Alternatively, or additionally, cache determiner component 510 may decide to store object 420 in storage device 220 when a temporal limit (e.g., a number of daily erase/write operations permitted by storage device 220 in accordance with a guaranteed life) of storage device 220 has not been reached. Alternatively, or additionally, cache determiner component 510 may skip storing object 420 in storage device 220 when the number of times that object 420 has been requested is less than or equal to the particular threshold number, and/or when the temporal limit of storage device 220 has been reached.

As further shown in FIG. 5, cache determiner component 510 may provide, to object information storage 520, the information associated with object 420, as indicated by reference number 540. In one example, the information associated with object 420 may include an identifier associated with object 420, such as a title, an identification number, etc.

Object information storage 520 may include one or more RAMs or other types of dynamic storage devices that may store information associated with objects, one or more ROM devices or other types of static storage devices that may store information associated with objects, etc. In one example, object information storage 520 may store information associated with one or more objects previously received by cache server 210, the information associated with object 420, etc.

Although FIG. 5 shows example functional components of cache server 210, in other implementations, cache server 210 may include fewer functional components, different functional components, differently arranged functional components, or additional functional components than depicted in FIG. 5. Alternatively, or additionally, one or more functional components of cache server 210 may perform one or more other tasks described as being performed by one or more other functional components of cache server 210.

Figure 6:
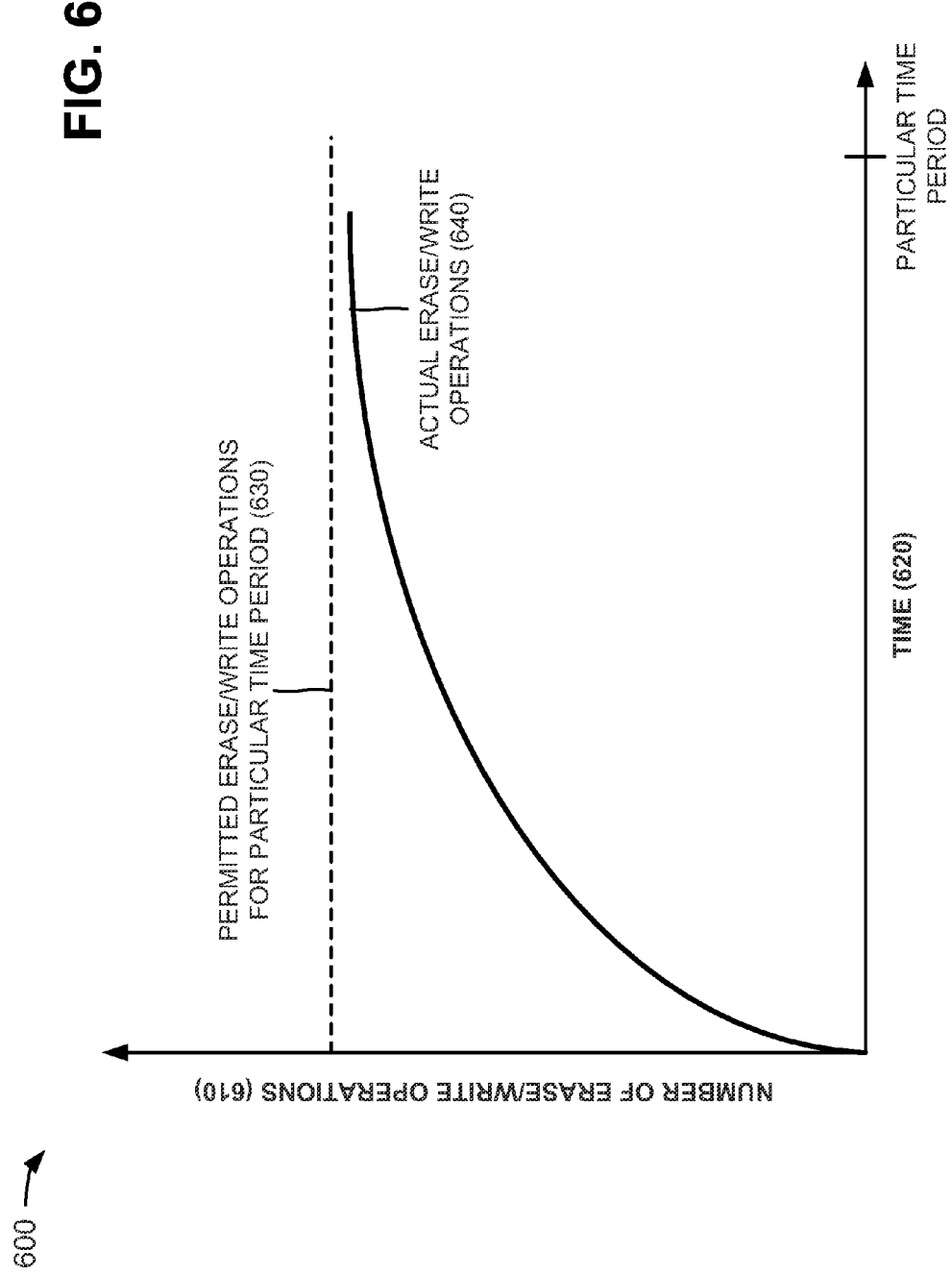
FIG. 6 is a graph of a typical erase/write throttling operation that may be performed by a storage device of FIG. 2.

FIG. 6 is a graph 600 of a typical erase/write throttling operation that may be performed by storage device 220 (FIG. 2) for a particular time period (e.g., a day). As shown in FIG. 6, graph 600 may include a number of erase/write operations axis 610 and a time axis 620. Number of erase/write operations axis 610 may include a number of erase/write operations that have been performed by storage device 220. Time axis 620 may include a total amount of time (e.g., in minutes, hours, etc.) over which a number of erase/write operations are performed by the storage device 220 in the particular time period. Horizontal line 630 (e.g., a threshold) may indicate a maximum number of permitted erase/write operations for the particular time period (e.g., a day, an hour, etc.) for storage device 220. Line 640 may indicate a number of actual erase/write operations performed by storage device 220 over the particular time period.

As shown in FIG. 6, the throttling operation may cause the rate of increase of the number of actual erase/write operations performed by storage device 220 (as indicated by line 640) to decrease as the maximum number of permitted erase/write operations (as indicated by line 630) is reached for the particular time period. The throttling operation may ensure that storage device 220 usage remains under a particular number of erase/write operations for the particular time period. In one example implementation, the throttling operation associated with storage device 220 may be disabled by cache server 210. Alternatively, or additionally, cache server 210 may not disable the throttling operation associated with storage device 220. In such a scenario, the throttling operation may work concurrently with cache server 210 in preserving the lifetime of storage device 220.

Figure 7:
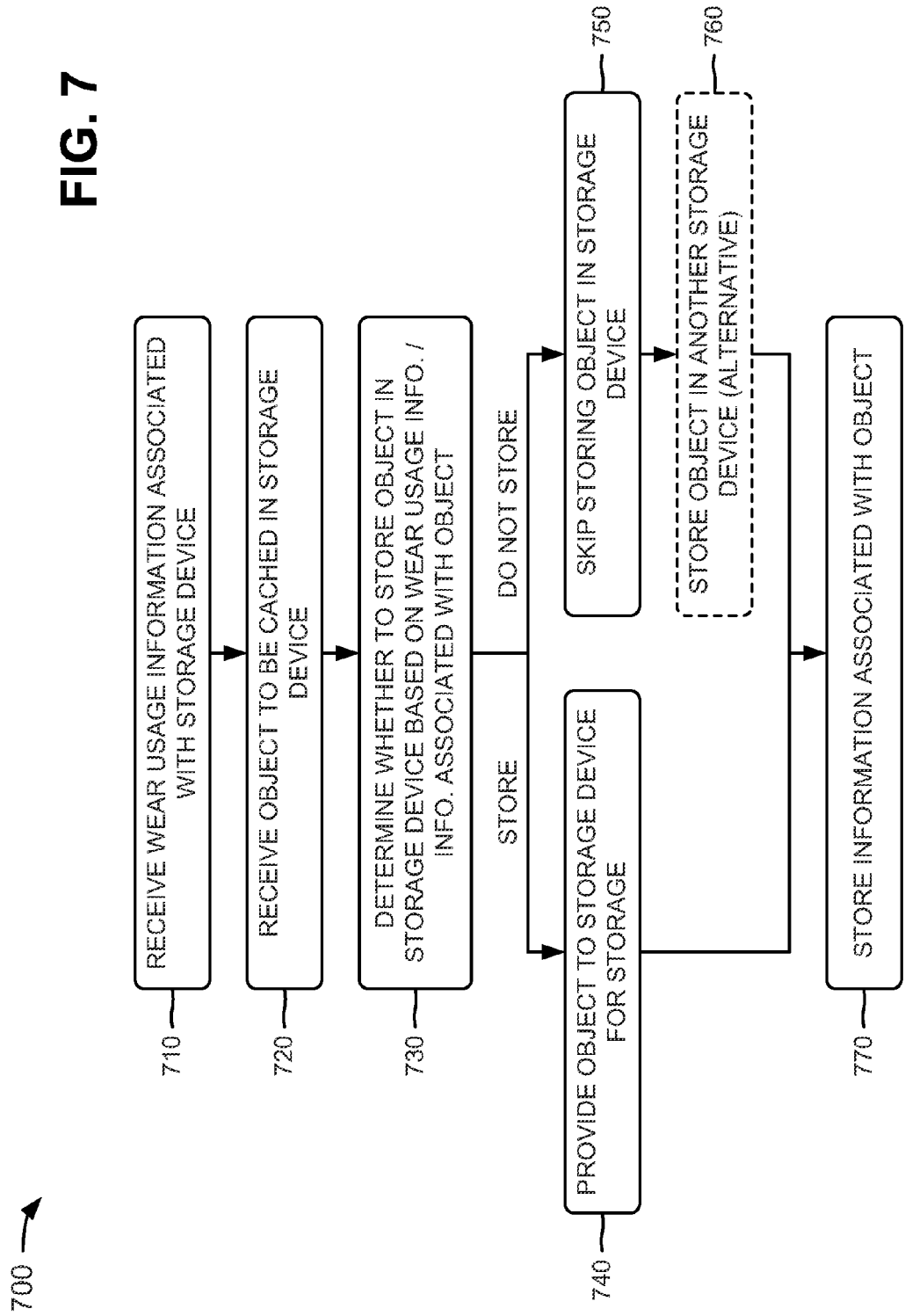
FIGS. 7-9 are flow charts of an example process for managing the lifetime of a limited usage storage device according to an implementation described herein.
Figure 8:
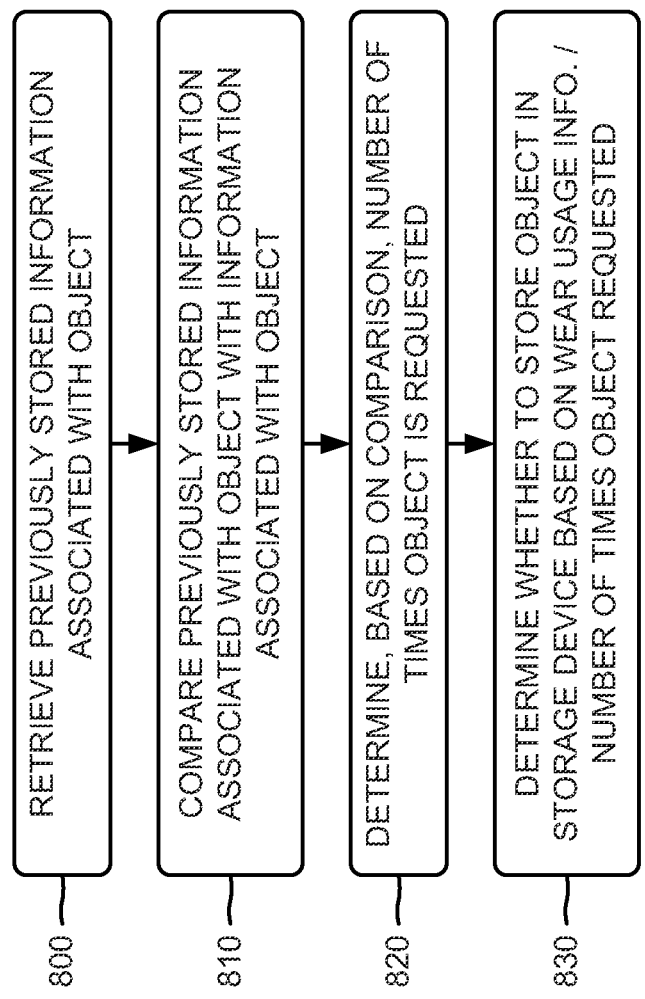
Figure 9:
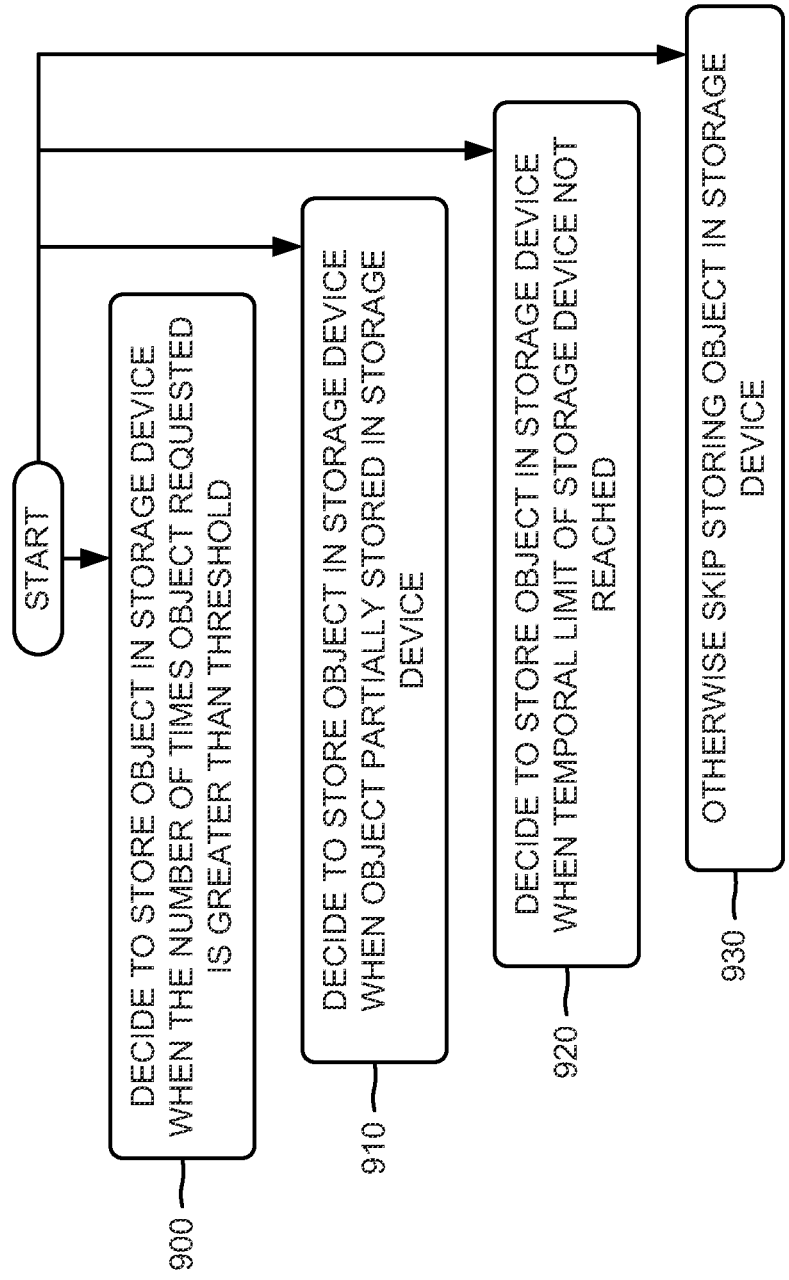

FIGS. 7-9 are flow charts of an example process 700 for managing the lifetime of a limited usage storage device according to an implementation described herein. In one implementation, process 700 may be performed by cache server 210. Alternatively, or additionally, some or all of process 700 may be performed by one or more devices other than cache server 210 or in combination with cache server 210.

One or more of the process blocks depicted in FIGS. 7-9 may be performed concurrently and independently of one or more other process blocks.

As illustrated in FIG. 7, process 700 may include receiving wear usage information associated with a storage device (block 710), and receiving an object to be cached in the storage device (block 720). For example, in an implementation described above in connection with FIG. 4, first storage device 220-1 may provide wear usage information 410-1 to cache server 210. Wear usage information 410-1 may be compared, by cache server 210, to a temporal limit of first storage device 220-1, such as number of daily erase/write operations permitted by first storage device 220-1 in accordance with a guaranteed life of first storage device 220-1, in order to determine whether to store an object in first storage device 220-1. Wear usage information 410-1 may also include an actual number of erase/write operations (or cycles) performed by first storage device 220-1 over a particular time period (e.g., a day, a week, etc.). Cache server 210 may receive wear usage information 410-1 from first storage device 220-1, and may receive object 420 to be cached (e.g., in first storage device 220-1).

As further shown in FIG. 7, process 700 may include determining whether to store the object in the storage device based on the wear usage information and/or information associated with the object (block 730). If the object is to be stored in the storage device (block 730-STORE), process 700 may include providing the object to the storage device for storage (block 740). For example, in an implementation described above in connection with FIG. 4, cache server 210 may determine whether to store object 420 in first storage device 220-1 based on wear usage information 410-1 associated with first storage device 220-1 and/or based on information associated with object 420 (e.g., whether object 420 is popular content, new content, old content, etc.). If cache server 210 determines that object 420 should be stored in first storage device 220-1, cache server 210 may provide object 420 to first storage device 220-1 for storage, as indicated by reference number 430.

Returning to FIG. 7, if the object is not to be stored in the storage device (block 730—DO NOT STORE), process 700 may include skipping the storing of the object in the storage device (block 750) and, alternatively, storing the object in another storage device (block 760). For example, in an implementation described above in connection with FIG. 4, if cache server 210 determines that object 420 should not be stored in first storage device 220-1, cache server 210 may skip storing object 420 in first storage device 220-1, as indicated by reference number 440. Alternatively, or additionally, if cache server 210 determines that object 420 should not be stored in first storage device 220-1, cache server 210 may provide object 420 to second storage device 220-2 for storage, as indicated by reference number 450.

As further shown in FIG. 7, process 700 may include storing the information associated with the object (block 770). For example, in an implementation described above in connection with FIG. 4, cache server 210 may store (e.g., in a memory associated with cache server 210) the information associated with object 420 so that cache server 210 may utilize such information if object 420 is provided to cache server 210 in the future.

Process block 730 may include the process blocks depicted in FIG. 8. As shown in FIG. 8, process block 730 may include retrieving previously stored information associated with the object (block 800), and comparing the previously stored information associated with the object with the information associated with the object (block 810). For example, in an implementation described above in connection with FIG. 5, cache determiner component 510 (e.g., of cache server 210) may retrieve previously stored information 530 associated with object 420 (if any) from object information storage 520. If cache determiner component 510 cannot retrieve previously stored information 530, cache determiner component 510 may determine that object is a new object and should not be stored in storage device 220. Cache determiner component 510 may compare previously stored information 530 with the information associated with object 420.

As further shown in FIG. 8, process block 730 may include determining, based on the comparison, a number of times the object is requested (block 820), and determining whether to store the object in the storage device based on the wear usage information and/or the number of times the object is requested (block 830). For example, in an implementation described above in connection with FIG. 5, cache determiner component 510 may compare previously stored information 530 with the information associated with object 420 to determine a number of times that object 420 has been requested. Cache determiner component 510 may determine whether to store object 420 in storage device 220 based on the number of times that object 420 has been requested and/or based on wear usage information 410.

Process block 830 may include the process blocks depicted in FIG. 9. As shown in FIG. 9, process block 830 may include deciding to store the object in the storage device when the number of times the object is requested is greater than a particular threshold (block 900); deciding to store the object in the storage device when the object is partially stored in the storage device (block 910); deciding to store the object in the storage device when a temporal limit of the storage device has not been reached (block 920); and/or otherwise skipping the storing of the object in the storage device (block 930).

For example, in an implementation described above in connection with FIG. 5, if a portion of object 420 is stored in storage device 220, cache determiner component 510 may determine that a remaining portion of object 420 should be stored in storage device 220, as indicated by reference number 430. Cache determiner component 510 may decide to store object 420 in storage device 220 when the number of times that object 420 has been requested is greater than a particular threshold number (e.g., three, four, five, etc.). Alternatively, or additionally, cache determiner component 510 may decide to store object 420 in storage device 220 when a temporal limit (e.g., a number of daily erase/write operations permitted by storage device 220 in accordance with a guaranteed life) of storage device 220 has not been reached. Alternatively, or additionally, cache determiner component 510 may skip storing object 420 in storage device 220 when the number of times that object 420 has been requested is less than or equal to the particular threshold number, and/or when the temporal limit of storage device 220 has been reached.

Systems and/or methods described herein may enable a caching system to manage lifetimes (or lives) of limited usage storage devices, such as NAND flash storage devices.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items and may be used interchangeably with 'one or more. Where only one item is intended, the term "one" or similar language is used. Further, the phrase "based on" is intended to mean "based, at least in part, on" unless explicitly stated otherwise.

What is claimed is:

1. A method, comprising:
  receiving, by a device, wear usage information associated with a storage device;
  receiving, by the device, an object to be cached in the storage device;
  determining, by the device, whether to store the object in the storage device based on the wear usage information, determining whether to store the object including:
    determining that the object is to be stored in the storage device when at least one of:
      a portion of the object is already stored in the storage device, or
      a temporal limit of the storage device has not been reached,
        the temporal limit indicating a quantity of erase/write operations permitted by the storage device within a particular period of time and
    determining that the object is not to be stored in the storage device when at least one of:
      the portion of the object is not already stored in the storage device, or
      the temporal limit of the storage device has been reached;
  providing, by the device, the object to the storage device for storage when the object is to be stored in the storage device; and
  preventing, by the device, the object from being stored in the storage device when the object is not to be stored in the storage device.

2. The method of claim 1, further comprising:
  providing the object to another storage device for storage when the object is not to be stored in the storage device.

3. The method of claim 1, further comprising:
  storing information associated with the object in a memory associated with the device.

4. The method of claim 1, where the object comprises one or more of audio data, video data, image data, or text.

5. The method of claim 1, where determining whether to store the object in the storage device further comprises:
  retrieving, from a memory associated with the device, previously stored information associated with the object;
  comparing the previously stored information associated with the object with information associated with the object;
  determining a number of times the object has been requested based on comparing the previously stored information associated with the object with the information associated with the object; and
  determining whether to store the object in the storage device based on the wear usage information and the number of times the object has been requested.

6. The method of claim 5, where determining whether to store the object in the storage device based on the wear usage information and the number of times the object has been requested comprises:
  determining that the object is to be stored in the storage device when the number of times the object has been requested is greater than a particular threshold; and
  determining that the object is not to be stored in the storage device when:
    the number of times the object has been requested is less than or equal to the particular threshold.

7. The method of claim 1, further comprising:
  disabling wear functionality associated with the storage device.

8. The method of claim 7, where the wear functionality includes erase/write cycle throttling performed by the storage device.

9. A device, comprising:
  a processor to:
    receive wear usage information associated with a storage device,
    receive an object to be cached in the storage device,
    determine whether to store the object in the storage device based on the wear usage information,
      when determining whether to store the object, the processor is to:
        determine that the object is to be stored in the storage device when at least one of:
          a portion of the object is already stored in the storage device, or
          a temporal limit of the storage device has not been reached,
            the temporal limit indicating a quantity of erase/write operations permitted by the storage device within a particular period of time and
        determine that the object is not to be stored in the storage device when at least one of:
          the portion of the object is not already stored in the storage device, or
          the temporal limit of the storage device has been reached,
    provide the object to the storage device for storage when the object is to be stored in the storage device, and
    prevent the object from being stored in the storage device when the object is not to be stored in the storage device.

10. The device of claim 9, where the processor is further to:
  provide the object to another storage device for storage when the object is not to be stored in the storage device.

11. The device of claim 9, where the processor is further to:
  store information associated with the object in a memory associated with the device.

12. The device of claim 11, where, when determining whether to store the object in the storage device, the processor is further to:

retrieve, from the memory associated with the device, previously stored information associated with the object, compare the previously stored information associated with the object with the information associated with the object, determine a number of times the object has been requested based on comparing the previously stored information associated with the object with the information associated with the object, and determine whether to store the object in the storage device based on the wear usage information and the number of times the object has been requested.

13. The device of claim 12, where, when determining whether to store the object in the storage device based on the wear usage information and the number of times the object has been requested, the processor is further to:

determine that the object is to be stored in the storage device when the number of times the object has been requested is greater than a particular threshold, and determine that the object is not to be stored in the storage device when:

the number of times the object has been requested is less than or equal to the particular threshold.

14. The device of claim 9, where the processor is further to:
disable wear functionality associated with the storage device.

15. The device of claim 14, where the wear functionality includes erase/write cycle throttling performed by the storage device.

16. A non-transitory computer-readable medium storing instructions, the instructions comprising:

one or more instructions that, when executed by a processor of a device, cause the processor to:

receive wear usage information associated with a storage device, receive an object to be cached in the storage device, determine whether to store the object in the storage device based on the wear usage information, the one or more instructions to determine whether to store the object including:

one or more instructions to determine that the object is to be stored in the storage device when at least one of:

a portion of the object is already stored in the storage device, or a temporal limit of the storage device has not been reached, the temporal limit indicating a quantity of erase/write operations permitted by the storage device within a particular period of time; and one or more instructions to determine that the object is not to be stored in the storage device when at least one of:

the portion of the object is not already stored in the storage device, or the temporal limit of the storage device has been reached, provide the object to the storage device for storage when the object is to be stored in the storage device, and prevent the object from being stored in the storage device when the object is not to be stored in the storage device.

17. The non-transitory computer-readable medium of claim 16, the instructions further comprising:

one or more instructions that, when executed by the processor, cause the processor to:

provide the object to another storage device for storage when the object is not to be stored in the storage device.

18. The non-transitory computer-readable medium of claim 16, the instructions further comprising:

one or more instructions that, when executed by the processor, cause the processor to:

store information associated with the object in a memory associated with the device.

19. The non-transitory computer-readable medium of claim 18, where the one or more instructions to determine whether to store the object in the storage device further comprise:

one or more instructions that, when executed by the processor, cause the processor to:

retrieve, from the memory associated with the device, previously stored information associated with the object, compare the previously stored information associated with the object with the information associated with the object, determine a number of times the object has been requested based on the comparison, and determine whether to store the object in the storage device based on the wear usage information and the number of times the object has been requested.

20. The non-transitory computer-readable medium of claim 19, where the one or more instructions to determine whether to store the object in the storage device based on the wear usage information and the number of times the object has been requested further comprise:

one or more instructions that, when executed by the processor, cause the processor to:

determine that the object is to be stored in the storage device when the number of times the object has been requested is greater than a particular threshold, and determine that the object is not to be stored in the storage device when:

the number of times the object has been requested is less than or equal to the particular threshold.

21. The non-transitory computer-readable medium of claim 16, the instructions further comprising:

one or more instructions that, when executed by the processor, cause the processor to:

disable erase/write cycle throttling performed by the storage device.

* * * * *